(12) United States Patent
Lee

(10) Patent No.: US 8,117,379 B2
(45) Date of Patent: Feb. 14, 2012

(54) METHOD OF PROCESSING HARD DISK DRIVE

(75) Inventor: Sang Hun Lee, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 12/428,724

(22) Filed: Apr. 23, 2009

(65) Prior Publication Data
US 2009/0271565 A1    Oct. 29, 2009

(30) Foreign Application Priority Data
Apr. 28, 2008    (KR) ............................. 2008-0039195

(51) Int. Cl.
G06F 12/00    (2006.01)
G06F 13/00    (2006.01)
G06F 9/00    (2006.01)
G06F 9/24    (2006.01)

(52) U.S. Cl. ................................. 711/103; 713/1; 713/2
(58) Field of Classification Search ..................... 713/2
See application file for complete search history.

(56) References Cited

U.S. PATENT DOCUMENTS

| | | | | |
|---|---|---|---|---|
| 6,069,758 A | * | 5/2000 | Chung | 360/31 |
| 2003/0081337 A1 | | 5/2003 | Tanimoto | |
| 2008/0052506 A1 | * | 2/2008 | Iima et al. | 713/1 |

FOREIGN PATENT DOCUMENTS

| | | |
|---|---|---|
| JP | 2003-228925 | 8/2003 |
| JP | 2003-297025 | 10/2003 |
| KR | 2004-21810 | 3/2004 |

* cited by examiner

Primary Examiner — Son Mai
(74) Attorney, Agent, or Firm — Stanzione & Kim, LLP

(57) ABSTRACT

A method of processing a hard disk drive. The method can include downloading at least two process codes and a main code to a first storage area of the hard disk drive, sequentially performing processes based on the at least two process codes, and installing the main code in a second storage area.

13 Claims, 8 Drawing Sheets

METHOD OF PROCESSING HARD DISK DRIVE

CROSS-REFERENCE TO RELATED APPLICATIONS

This application claims priority under 35 U.S.C. §119 from Korean Patent Application No. 10-2008-0039195, filed on Apr. 28, 2008 in the Korean Intellectual Property Office, the disclosure of which is incorporated herein by reference in its entirety.

BACKGROUND

1. Field of the General Inventive Concept

The present general inventive concept relates to a hard disk drive, and more particularly, to a method of processing a hard disk drive efficiently by effectively managing processes of the hard disk drive.

FIG. 1 illustrates conventional production processes of a hard disk drive. After a printed circuit board (PCB) assembly process S30, a servo copy process S40, a function test process S50, and a burn-in test process S60 are performed, and the hard disk drive is completed when a main code to be used by a user, that is, firmware of the hard disk drive is finally recorded in the hard disk drive. It would be apparent that a parts cleaning and assembly process S10 and a servo write process S20 may be performed before the PCB assembly process S30.

2. Description of the Related Art

Conventionally, process codes are separated and individually downloaded to perform all of the above-described processes. In addition, before downloading a process code for a subsequent process, initialization is performed by turning off and on power. For instance, before performing a servo copy process, only a process code necessary for the servo copy process is downloaded to a hard disk drive, the servo copy process is performed based on the downloaded code, and initialization is performed by turning off and on power. Thereafter, a process code for a subsequent process (e.g., a function test process) is downloaded.

In such conventional production processes, production efficiency is decreased due to the requirements of turning off and on power, initialization, and indispensable process code downloading time. Therefore, a hard disk drive processing method that solves these and other problems by minimizing the process code downloading time is desired.

SUMMARY

Some embodiments of the present general inventive concept provide a hard disk drive processing method of increasing production efficiency by minimizing the number of downloads.

Additional aspects and utilities of the present general inventive concept will be set forth in part in the description which follows and, in part, will be obvious from the description, or may be learned by practice of the general inventive concept.

According to some embodiments of the present general inventive concept, there is provided a method of processing a hard disk drive. The method includes downloading at least two process codes and a main code to a first storage area of the hard disk drive, sequentially performing processes based on the at least two process codes, and installing the main code in a second storage area. The first storage area may be a first flash memory. The at least two process codes may include at least two among a servo copy code, a function/HDA test code, and a burn-in code.

The second storage area may include at least one among a portion of the first flash memory and a second flash memory. The first flash memory and the second flash memory may be a NAND flash memory and a NOR flash memory, respectively. The method may further include removing a process code corresponding to a process that has been completed from the first storage area. The hard disk drive may be one of a hybrid disk drive and a solid state drive (SSD).

The sequentially performing the processes based on the at least two process codes may include loading one of the at least two process codes to at least one among the second storage area and a random access memory (RAM) and performing a process based on the loaded process code. The sequentially performing the processes based on the at least two process codes may further include performing a soft reset after the process is completed.

According to other embodiments of the present general inventive concept, there is provided a method of processing a hard disk drive. The method includes downloading process codes necessary for all processes and a main code to a first storage area of the hard disk drive, sequentially performing the processes based on the process codes, and installing the main code in the hard disk drive after all of the processes are completed.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which

DETAILED DESCRIPTION OF THE EMBODIMENTS

Figure 1:
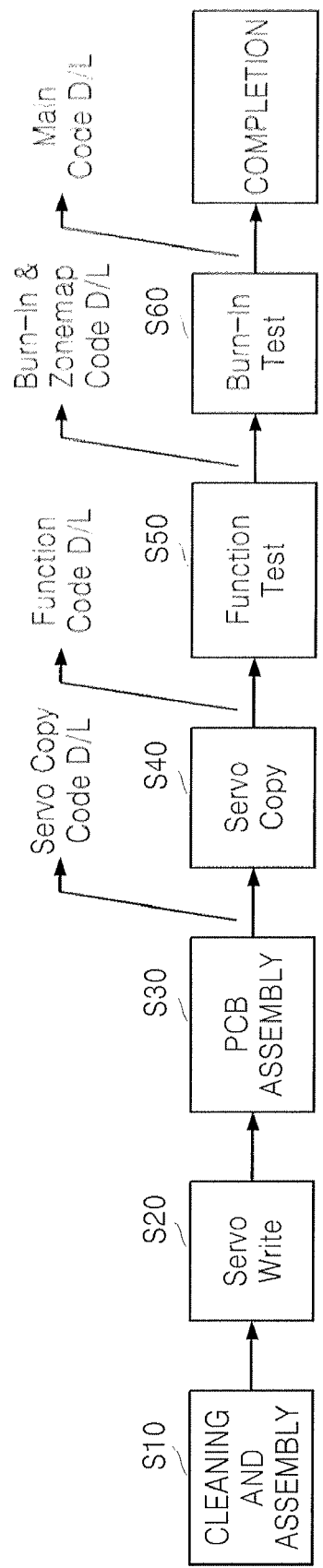
FIG. 1 illustrates conventional production processes of a hard disk drive.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The present general inventive concept now will be described more fully hereinafter with reference to the accompanying drawings, in which embodiments of the general inventive concept are shown. This general inventive concept may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc., may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 2:
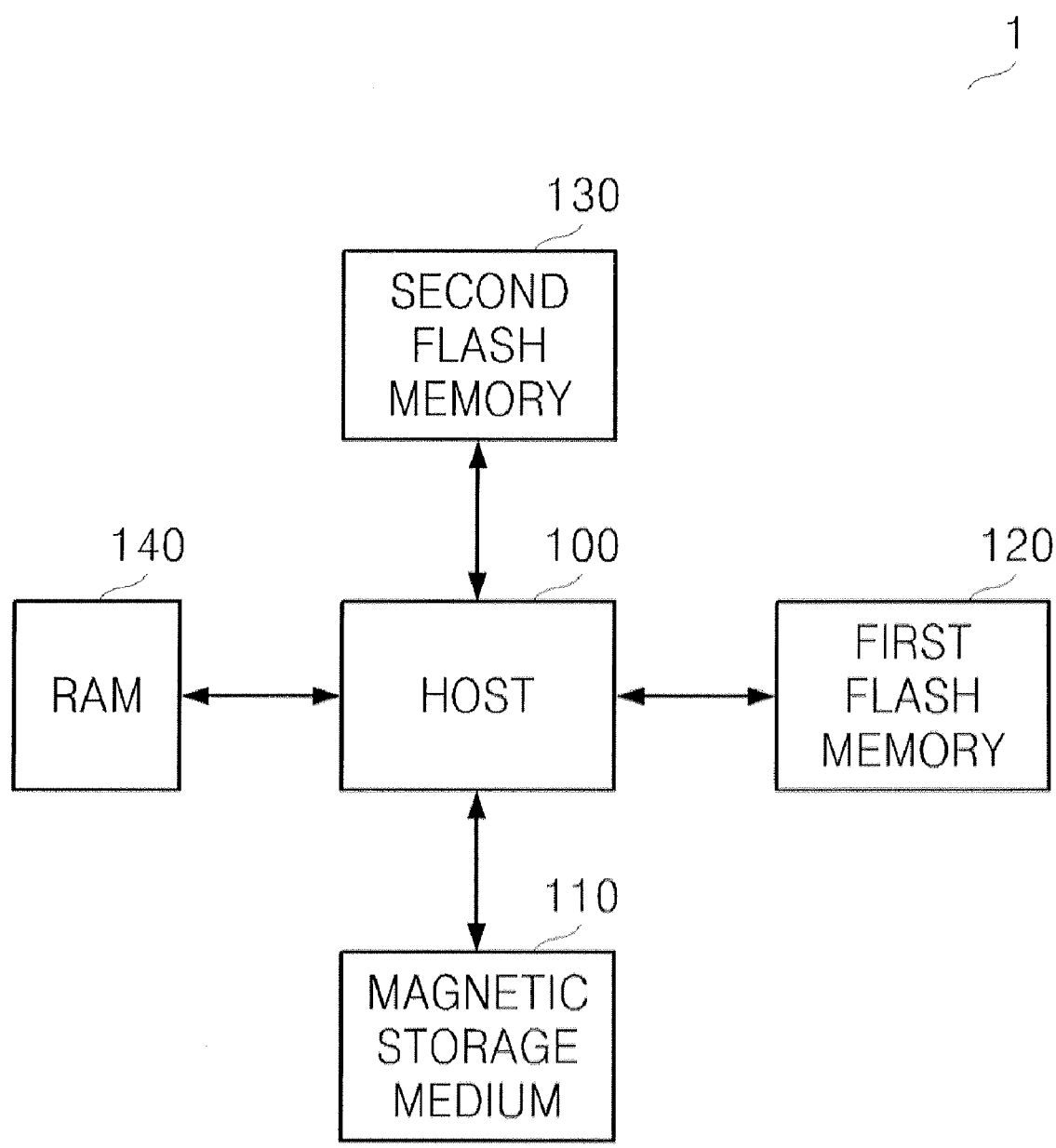
FIG. 2 illustrates the schematic structure of a hard disk drive according to some embodiments of the present general inventive concept.

FIG. 2 illustrates the schematic structure of a hard disk drive 1 according to some embodiments of the present general inventive concept. Referring to FIG. 2, a storage device such as the hard disk drive 1 includes a host 100, a first storage (area) 120 (i.e., flash memory), and a random access memory (RAM) 140. The hard disk drive 1 may further include a magnetic storage medium 110 and/or a code memory 130 (i.e., a second flash memory).

When the first storage 120 is a first flash memory and the hard disk drive 1 includes the magnetic storage medium 110, the hard disk drive 1 may be a hybrid disk drive. When the hard disk drive 1 includes the first storage area 120 but does not include the magnetic storage medium 110, it may be a solid state drive (SSD).

In any case, the hard disk drive 1 includes the first storage 120 which is flash memory to store data and the first storage 120 may have enough capacity to store all of process codes used in some embodiments of the present general inventive concept. The magnetic storage medium 110 may refer to a conventional normal hard disk drive and may include at least one disk and at least one head to read data from the disk or write data to the disk. The structure and the function of the magnetic storage medium 110 have been widely known. Thus, detailed descriptions thereof will be omitted.

The code memory 130 is used to store a main code or firmware and to update data in a conventional hard disk drive. For instance, the code memory 130 is implemented by a NOR flash memory in a conventional hard disk drive. The NOR flash memory is expensive but allows single bit access through a parallel structure and has advantages of data reliability and fast transmission. The NOR flash memory includes a data line and an address line in a parallel structure and is connected with an internal control unit (e.g., a central processing unit (CPU) or a microcontroller (MCU)) in a conventional hard disk drive. A method of processing the hard disk drive 1 according to some embodiments of the present general inventive concept can be used in both a case where the hard disk drive 1 includes the code memory 130 and a case where the hard disk drive 1 does not include the code memory 130.

Consequently, a method of processing the hard disk drive 1 according to some embodiments of the present general inventive concept can be used for a hard disk drive including the first storage 120 that can store at least two process codes. Hereinafter, it is assumed that the first storage 120 is a non-volatile memory, such as a flash memory.

As described above, in a conventional method of processing a hard disk drive, each of a plurality of process codes is separately downloaded at each corresponding process to perform the process. In a method of processing a hard disk drive according to some embodiments of the present general inventive concept, however, at least two process codes are downloaded at a same time, so that improvement can be made in turning on/off power, initialization, and downloading time. However, when the capacity of the code memory 130 is increased in order to download two or more process codes at a time, production cost increases. The hard disk drive 1 according to embodiments of the present general inventive concept includes the first storage (e.g., flash memory) 120 separated from the magnetic storage medium 110. When process codes necessary for all processes, information regarding a zonemap, and a main code (i.e., firmware) to be finally used by a user are stored in the first storage 120 and a necessary process code or information is fetched from the first storage 120 at each process, the number of code downloads can be reduced. This technical idea is illustrated in FIG. 3.

Figure 3:
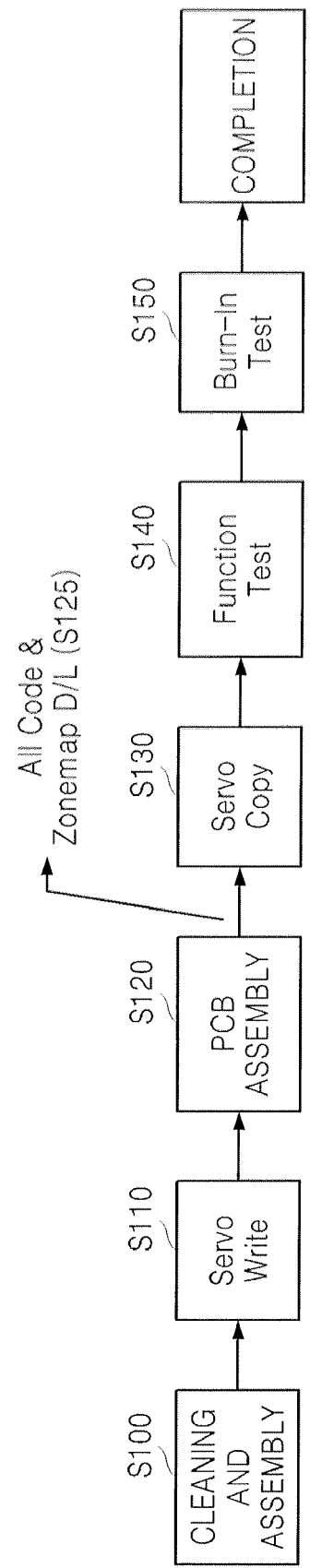
FIG. 3 is a flowchart explaining a method of processing a hard disk drive according to some embodiments of the present general inventive concept.

FIG. 3 is a flowchart explaining a method of processing (or manufacturing) the hard disk drive 1 according to some embodiments of the present general inventive concept. Referring to FIG. 3, the method includes downloading at least two process codes and a main code to the first storage area 120 in the hard disk drive 1 in operation S125; sequentially performing processes based on the downloaded process codes in operations S130, S140, and S150; and installing the main code in a second storage, such as the code memory 130.

While a process code is downloaded before each process is performed in the conventional method illustrated in FIG. 1, at least two process codes can be downloaded at a time in the method illustrated in FIG. 3. The first storage 120 may be used as memory by a user for storing data. The first storage 120 may be first flash memory as described above. The first flash memory may be a NAND flash memory or a NOR flash memory.

When the first storage 120 is implemented by a NOR flash memory, at least two process codes may be downloaded to predetermined memory addresses, respectively, in the first storage 120 and then may be loaded to the RAM 140 or the code memory 130, which is connected with the host (e.g., a CPU or an MCU) 100 before processes are performed. After the processes are completed, the main code is updated in the code memory 130 connected with the host 100, and then a region corresponding to the predetermined memory addresses where the at least two process codes have been stored in the first storage 120 may be restored so that a user can use the region.

When the hard disk drive 1 does not include the code memory 130 in some alternative embodiments of the present general inventive concept, at least two process codes may be downloaded to predetermined memory addresses, respectively, in the first storage 120, and then among the at least two process codes only at least part of a process code corresponding to a current process is sequentially loaded to the RAM 140 connected with the host 100 to perform each process. After all processes are completed, the main code is stored in a portion of the first storage 120. In other words, since the code memory 130 to store the main code is not provided, the main code is stored in a portion of the first storage 120, and when the hard disk drive 1 is activated by a user, a necessary part of the main code is uploaded to the RAM 140 to activate the hard disk drive 1.

When each process for the hard disk drive 1 is completed, soft reset may be performed to replace a conventional power on/off operation. Basic information necessary to perform a current process or a subsequent process (e.g., current process information, subsequent process information, or an address where each process code is stored) may be stored in a special storage region (e.g., a portion of the first storage 120 or a buffer or a maintenance cylinder (MC) of the magnetic storage medium 110).

When the first storage 120 is a NAND flash memory in some embodiments of the present general inventive concept, at least two process codes may also be downloaded to predetermined memory addresses, respectively, in the first storage 120. Differently from the case where the first storage 120 is a NOR flash memory, since the NAND flash memory does not allow direct access due to a parallel structure, only necessary parts of each process code may be sequentially loaded to at least one of the RAM 140 and the code memory 130 for an update.

When the code memory 130 is not provided, as described above, essential information about each process (e.g., current process information) and a special code to load each process code to the RAM 140 may be stored in a predetermined region of the first storage 120 (e.g., in the first block of the first flash memory). After all processes are completed, the main code may be stored in the predetermined region of the first storage 120 (e.g., the first block of the first flash memory). When each process is completed, a soft reset may be performed to proceed to a subsequent process.

Consequently, although the way of accessing each process code stored in the first storage 120 is different between the case where the first storage 120 is a NOR flash memory and the case where the first storage 120 is a NAND flash memory, the technical idea of downloading at least two process codes at a time and loading a necessary code for each process to the RAM 140 or the code memory 130 to perform each process is equally applied to both cases. Meanwhile, the at least two process codes may include at least two among a servo copy code, a function/HDA test code, and a burn-in code. At least two process codes may include all codes necessary for processes performed on the hard disk drive 1.

Figure 4:
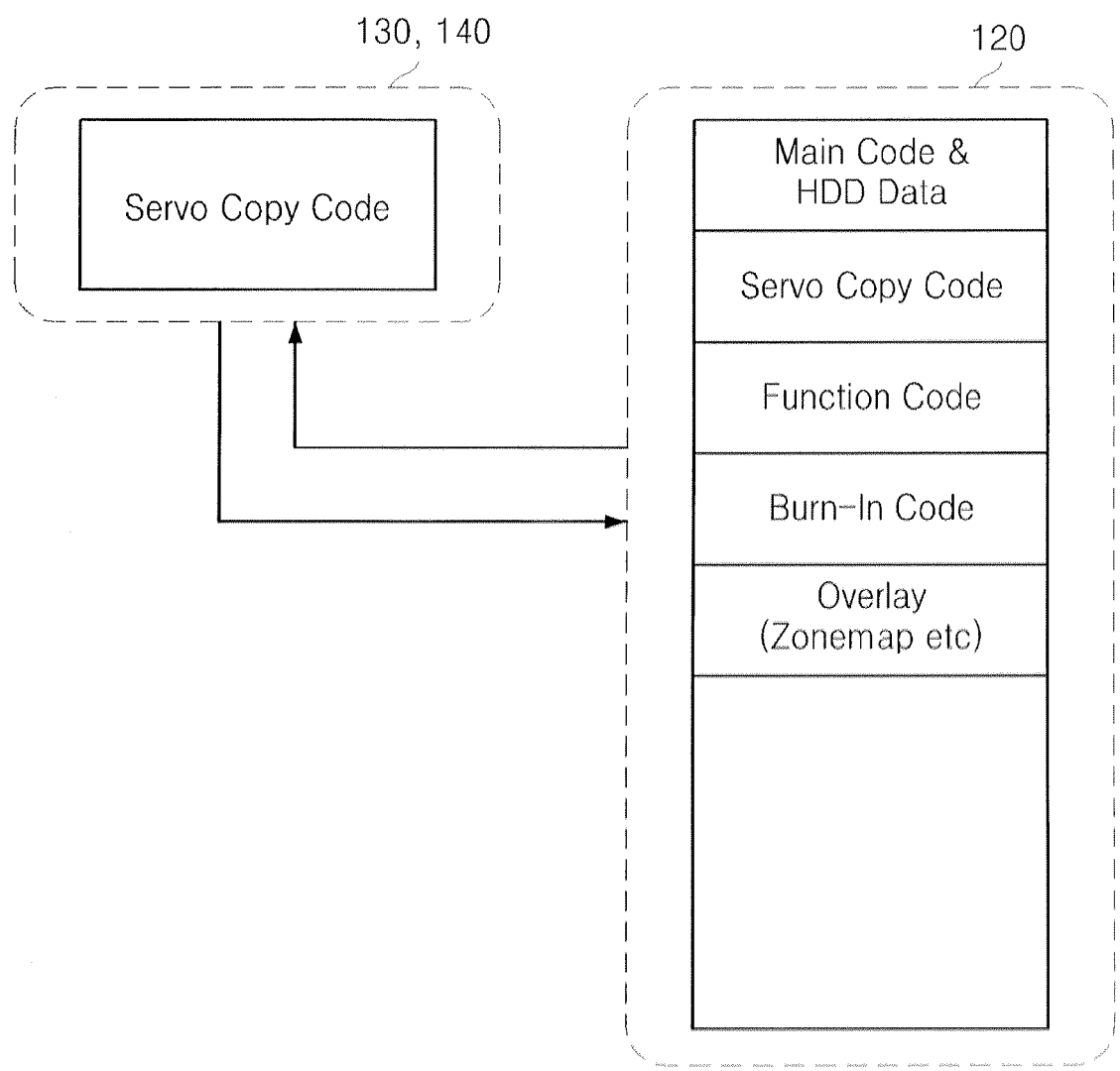
FIGS. 4 through 8 illustrate memory states at stages in a hard disk drive processing method according to some embodiments of the present general inventive concept.
Figure 5:
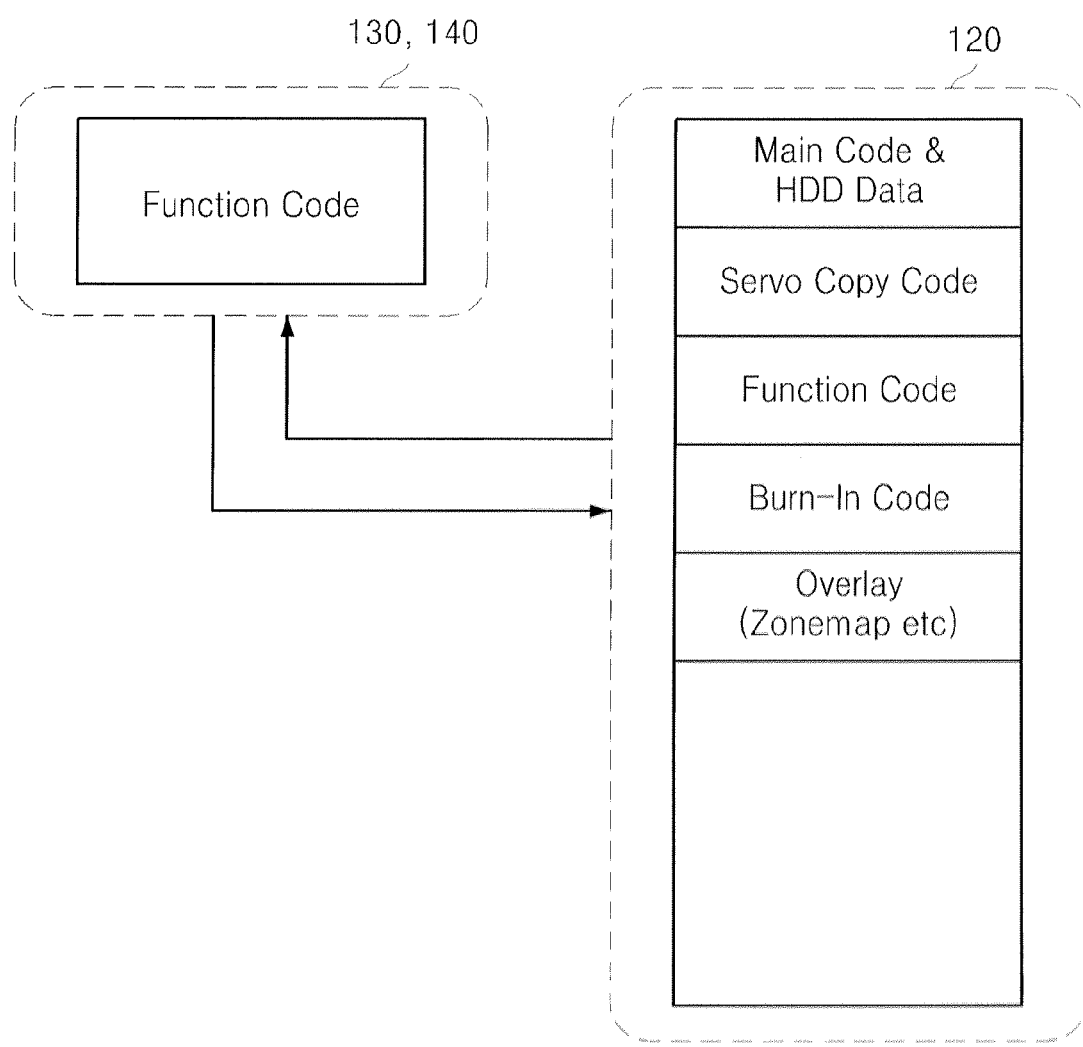

FIGS. 4 through 8 illustrate memory states at stages in a hard disk drive processing method according to some embodiments of the present general inventive concept. Referring to FIG. 4, process codes for all processes following a printed circuit board (PCB) assembly process are downloaded to the first storage 120. Thereafter, a process code necessary for the subsequent process (i.e., a servo copy process) may be loaded to at least one among the RAM 140 or the code memory 130. When the process code is loaded to at least one among the RAM 140 or the code memory 130, the process code may be entirely or partially and sequentially loaded thereto. As described above, information indicating a process immediately following a current process or a special code to load a process code from the first storage 120 to the RAM 140 or the code memory 130 may be stored at a special storage region (not shown) in the hard disk drive 1.

After the servo copy process is completed, the hard disk drive 1 may perform a soft reset. Thereafter, referring to FIG. 5, a function code to perform a function test process may be loaded to at least one among the RAM 140 or the code memory 130. Then, the function test process can be performed.

Figure 6:
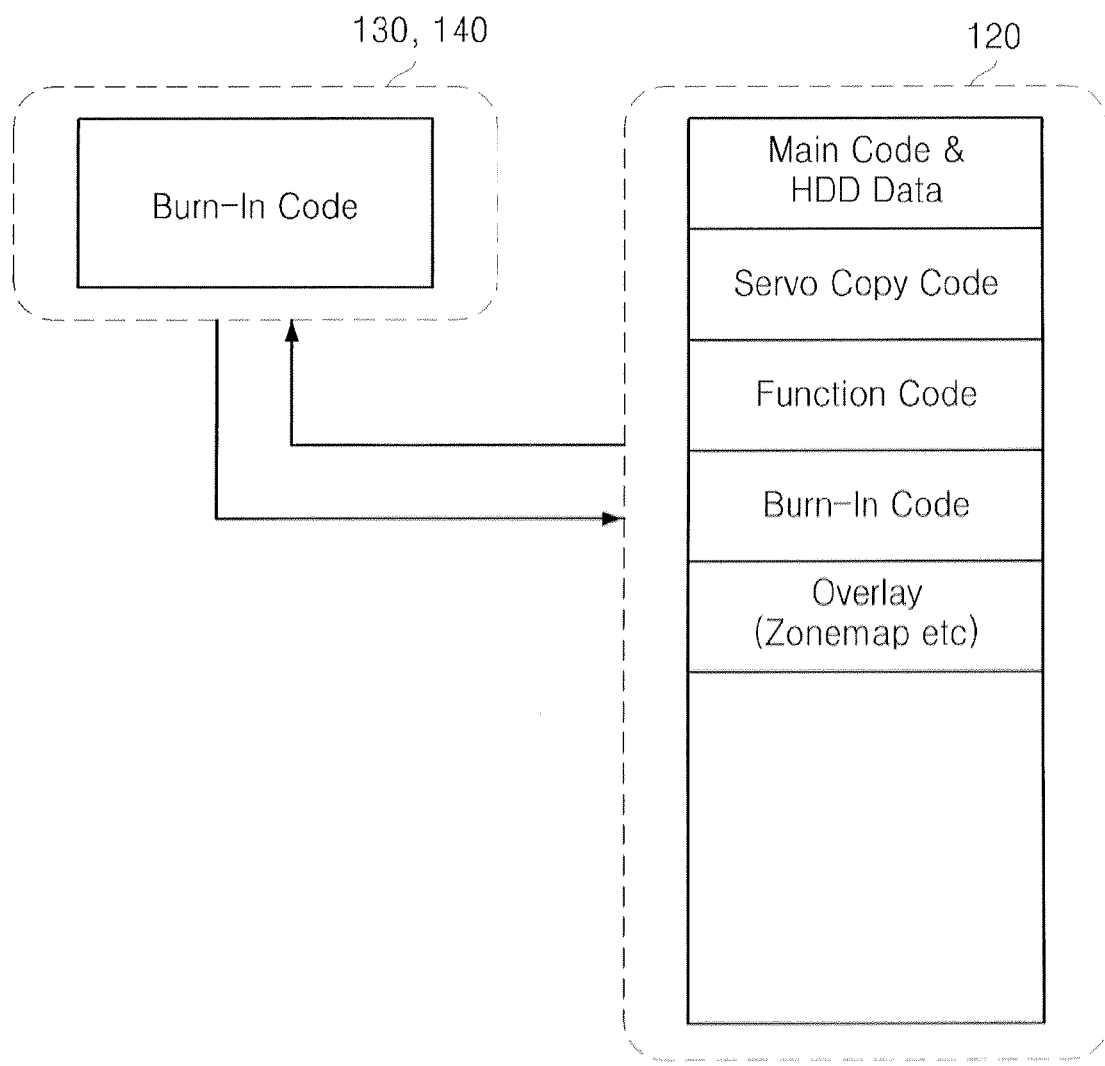

Thereafter, the soft reset may be performed. Referring to FIG. 6, a burn-in code to perform a burn-in test process may be loaded to at least one among the RAM 140 or the code memory 130. After the burn-in test process is completed, information (e.g. zonemap information, etc.) necessary to activate the hard disk drive 1 may be installed at a predetermined region (e.g., an MC of the magnetic storage medium 110) in the hard disk drive 1.

Figure 7:
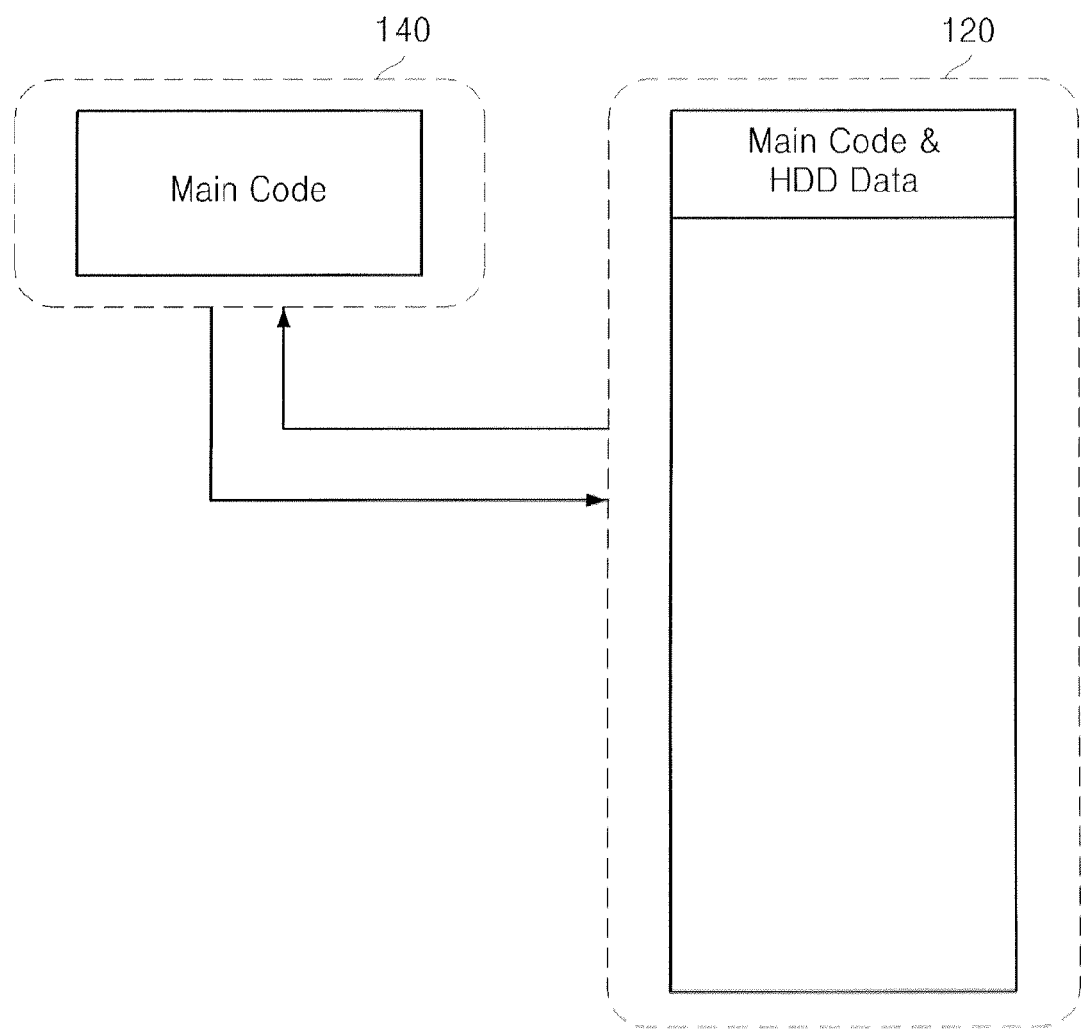

FIG. 7 illustrates a memory state after all processes are completed when the code memory 130 is not provided. Since the hard disk drive 1 does not include the code memory 130, the main code may be stored in a predetermined region (e.g., the first block) of the first storage 120 and a necessary part of the main code may be loaded to the RAM 140 to activate the hard disk drive 1. When the RAM 140 has a large capacity, the main code may reside in the RAM 140.

Figure 8:
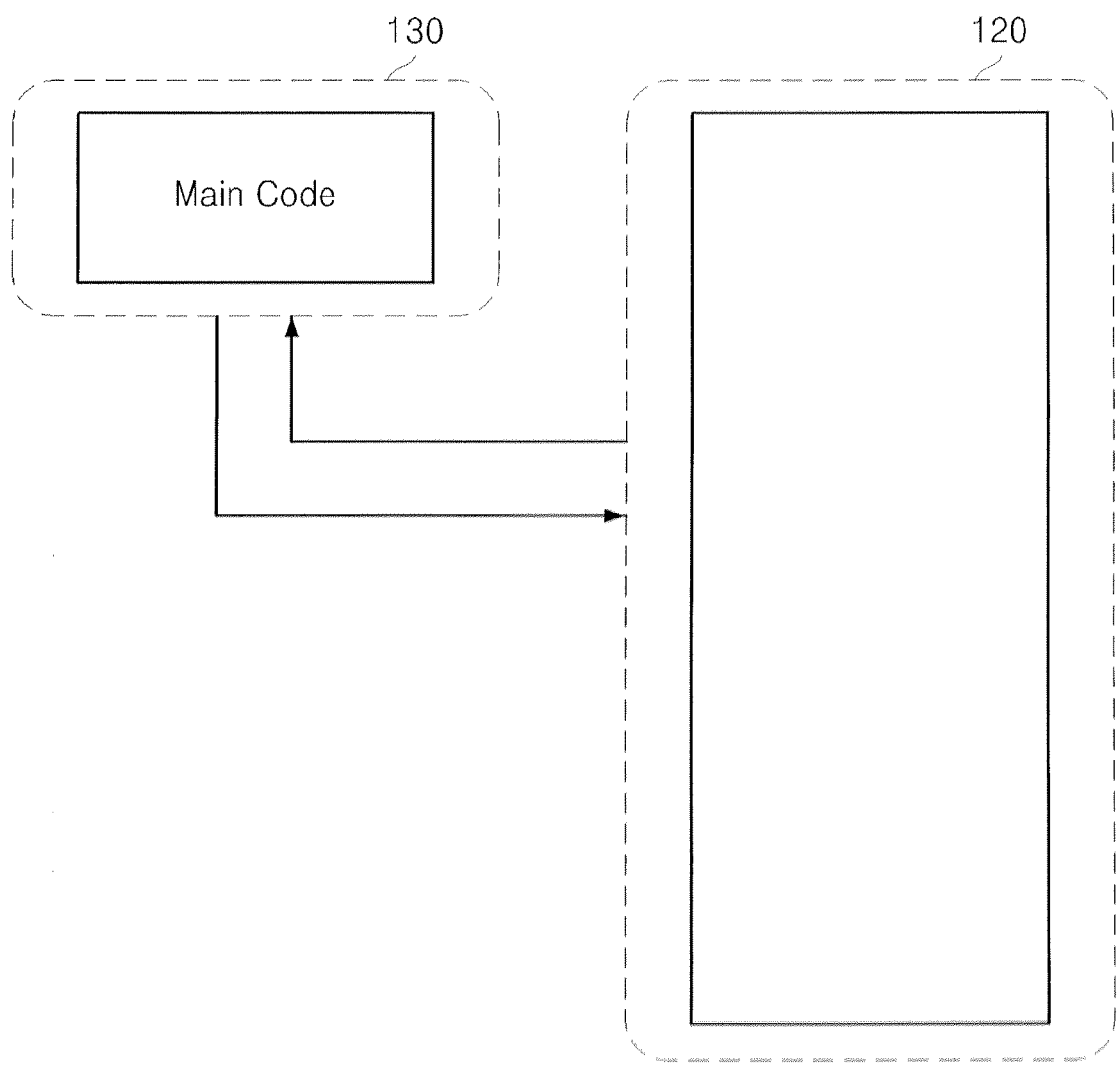

FIG. 8 illustrates a memory state after all processes are completed when the code memory 130 is provided. The main code may be installed in the code memory 130, and therefore, the first storage 120 may be restored to be used by a user. The code memory 130 may be implemented by a NOR flash memory, but the general inventive concept is not restricted thereto.

According to some embodiments of the present general inventive concept, the number of process code downloads can be reduced, so that a power on/off operation, initialization, and downloading time can be reduced. As a result, production efficiency can be increased. In addition, plural process codes are downloaded at a time to existing non-volatile memory without requiring additional memory, so that mass productivity is increased and manufacturing costs are decreased.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of processing a hard disk drive, the method comprising:
   downloading at least two process codes and a main code to a first storage area of the hard disk drive;
   sequentially performing processes based on the at least two process codes; and
   installing the main code in a second storage area.
2. The method of claim 1, wherein the first storage area is a first flash memory.

3. The method of claim 1, wherein the at least two process codes comprise at least two among a servo copy code, a function/HDA test code, and a burn-in code.

4. The method of claim 2, wherein the second storage area comprises at least one among a portion of the first flash memory and a second flash memory.

5. The method of claim 4, wherein the first flash memory and the second flash memory are a NAND flash memory and a NOR flash memory, respectively.

6. The method of claim 1, further comprising:
  removing a process code corresponding to a process that has been completed from the first storage area.

7. The method of claim 1, wherein the hard disk drive is one of a hybrid disk drive and a solid state drive (SSD).

8. The method of claim 1, wherein the sequentially performing the processes based on the at least two process codes comprises:
  loading one of the at least two process codes to at least one among the second storage area and a random access memory (RAM); and
  performing a process based on the loaded process code.

9. The method of claim 8, wherein the sequentially performing the processes based on the at least two process codes further comprises:
  performing soft reset after the process is completed.

10. A method of processing a hard disk drive, the method comprising:
  downloading process codes necessary for all processes and a main code to a first storage area of the hard disk drive;
  sequentially performing the processes based on the process codes; and
  installing the main code in the hard disk drive after all of the processes are completed.

11. A method of processing a hard disk drive, the method comprising:
  downloading a plurality of process codes necessary for all processes to predetermined memory addresses of a first storage area of the hard disk drive;
  sequentially loading at least part of a process code among the plurality of downloaded process codes corresponding to a current process to a RAM connected with a host to perform each process; and
  storing a main code in a portion of the first storage area.

12. The method of claim 11, wherein the first storage area is a NAND flash memory.

13. The method of claim 11, wherein the first storage area is a NOR flash memory.

* * * * *